US006316071B1

(12) United States Patent
Chosa et al.

(10) Patent No.: US 6,316,071 B1
(45) Date of Patent: Nov. 13, 2001

(54) SUBSTRATE FOR DIGITAL VERSATILE DISK AND PROCESS FOR PRODUCING THE SAME

(75) Inventors: Munehiro Chosa, Tokyo; Masaya Okamoto; Yasuhiro Ishikawa, both of Ichihara, all of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/379,111

(22) Filed: Aug. 23, 1999

(30) Foreign Application Priority Data

Mar. 12, 1999 (JP) .................................... 11-066625

(51) Int. Cl.$^7$ .................................................. C08G 64/00
(52) U.S. Cl. ......................... 428/64.1; 528/196; 528/198; 528/204
(58) Field of Search .................. 428/64.1, 64.4, 428/64.7, 412; 528/196, 198

(56) References Cited

U.S. PATENT DOCUMENTS

| 4,680,374 | * | 7/1987 | Hasuo et al. | ......................... 528/204 |
| 4,734,488 | * | 3/1988 | Hasuo et al. | ......................... 528/196 |
| 4,997,903 | * | 3/1991 | Okamoto | ............................. 528/198 |
| 5,783,653 | * | 7/1998 | Okamoto | ............................. 528/196 |

* cited by examiner

*Primary Examiner*—Harold Pyon
*Assistant Examiner*—Shalie Manlove
(74) *Attorney, Agent, or Firm*—Oblon, Spivak, McClelland, Maier & Neustadt, P.C.

(57) ABSTRACT

A digital versatile disk (DVD) excellent in transferability on injection molding, and excellent in releasability from a mold and in strength is provided. The substrate of the digital versatile disk (DVD) comprises an aromatic polycarbonate resin composition containing a fatty acid monoglyceride having from 14 to 30 carbon atoms in an amount of from 0.015 to 0.05% by weight, wherein the aromatic polycarbonate resin contains an end group, 30% by mol or more of which is a p-cumylphenoxy group and/or a p-tert-octylphenoxy group, and has a viscosity average molecular weight (Mv) of from 10,000 to 17,000. The thickness of the substrate is generally 0.6 mm or less.

8 Claims, No Drawings

SUBSTRATE FOR DIGITAL VERSATILE DISK AND PROCESS FOR PRODUCING THE SAME

BACKGROUND OF THE INVENTION

1. Field of the Invention

The present invention relates to a resin substrate used for a high density optical recording medium, in which recording and reproduction of information, or recording, reproduction, and deletion of information are conducted by convergence of an optical beam, and more specifically it relates to a substrate for a digital versatile disk that is excellent in moldability and strength characteristics, a resin composition for the substrate, a process for producing the substrate, and a digital versatile disk.

2. Description of the Related Art

As an optical disk for recording and reproduction of information by irradiation with laser light, a magnetoptical disk (MO), a write once optical disk (CD-R etc.), a digital audio disk (compact disk (CD), CD-ROM) and an optical video disk (laser disk) have been known. Among these, a compact disk and a laser disk are read only optical disks, and a write once optical disk and a magnetoptical disk are RAM (random access memory) type optical disks, which are quickly spreading as various recording media.

The standard of a read only digital video disk (DVD-ROM) having a high density recording capacity (4.7 GB) has been established, and since then high density in information recording, high quality in voice recording and high minuteness in image recording of the digital video disk are receiving attention. As a method for recording and reproduction of information for the digital video disk, a pre-pit method is employed for a read only digital video disk (DVD-ROM), a dye recording method is employed for a write once digital video disk (DVD-R), and a phase transition method is employed for a rewritable digital video disk (DVD-RAM) These digital video disks are spreading into not only video but also a wide range of fields of a recording medium for audio and computers, and the standardization thereof has been established or is being considered to be established. The invention relates to a digital versatile disk, which means such a wide range of optical recording media, and the term DVD is used herein as a digital versatile disk.

The information recording density of a DVD is increased by such a manner that the wavelength of the irradiating laser light is shortened from 780 nm to the range of from 635 to 650 nm, and simultaneously the numeral aperture of an object lens is increased from 0.45 to the range of from 0.52 to 0.6, and it is also increased by reducing the thickness of the substrate by half, i.e., from 1.2 mm to 0.6 mm, to shorten the path, in which the laser light travels within the disk substrate.

While a resin, such as a polycarbonate resin, an acrylic resin, and an epoxy resin, and glass are used as a material of a substrate for a DVD, a resin is mainly employed since it can be molded into a precise shape by injection molding, and is suitable for mass production. However, because the thickness of the substrate becomes thinner as reduced from 1.2 mm to 0.6 mm as described above, the impact resistance of the substrate is becoming an important factor. Accordingly, an aromatic polycarbonate resin is used as a material of a substrate in view of strength, such as impact resistance, as well as transparency, heat resistance and low water absorbing property.

The inventors have proposed (1) a digital video disk substrate comprising a polycarbonate-polyorganosiloxane copolymer, or comprising the copolymer and a polycarbonate resin (JP-A-9-265663), (2) a digital video disk substrate comprising a resin having a specific end group and a viscosity average molecular weight of from 10,000 to 17,000 (JP-A-9-320110), and (3) a digital video disk substrate comprising a polycarbonate resin having a viscosity average molecular weight of from 10,000 to 17,000 and a molecular weight distribution (weight average molecular weight (Mw)/number average molecular weight (Mn)) of 2.3 or more (WO97/36292).

There have been also proposed as a substrate suitable for a DVD (4) an optical disk substrate comprising an aromatic polycarbonate resin, in which at least 20% by mol of the total aromatic dihydroxyl component is 1,1-bis (hydroxyphenyl)-3,3,5-trimethylcyclohexane, and various characteristics are specified (JP-A-8-293128), and (5) a substrate for an optical disk comprising a resin composition comprising an aromatic polycarbonate resin comprising from 10 to 60% by mol of a constitutional unit derived from a fluorene-containing aromatic diol and from 90 to 40% by mol of a constitutional unit derived from the other aromatic diol than described above, in which a carbon atom connected to a phenyl group has another phenyl group (JP-A-10-310692).

The substrates (4) and (5) described above uses the extremely special polycarbonate resins, and thus they are inferior in general-purpose properties and are expensive. Furthermore, they relate to a general optical disk, and although there are general descriptions for an optical disk, what is evaluated therein is a substrate having a thickness of 1.2 mm, but a substrate having a thickness of 0.6 mm is not described.

Furthermore, (6) JP-A-9-208684 discloses a polycarbonate resin of a high flowability, which is a polycarbonate resin having a viscosity average molecular weight (Mv) of from 13,000 to 20,000, in which a low molecular weight component having a molecular weight of 1,000 or less contained in the polycarbonate resin is less than 1% by weight, and a polycarbonate oligomer having a molecular weight of from 2,000 to 5,000 is 10% by weight or more. JP-A-9-208684 also discloses that the resin has a good transferability and a high-cycle moldability suitable for producing an optical recording medium, such as a digital video disk, and can reduce attached matters to a stamper. However, there is only a specific evaluation where a substrate having a thickness of 1.2 mm is molded at a resin temperature of 340° C. and a mold temperature of 90° C.

Moreover, (7) JP-A-10-60105 and JP-A-11-35671 disclose a polycarbonate resin composition for an optical disk substrate containing from 0.06 to 0.1% by weight of a fatty acid monoglyceride having from 14 to 30 carbon atoms and from 3.5 to 8% by weight of a low molecular weight component composed of from 1 to 4 carbonate repeating units, and a polycarbonate resin composition for an optical disk substrate containing from 3.5 to 8% by weight of a low molecular weight component composed of from 1 to 4 carbonate repeating units (provided that the cases containing from 0.06 to 0.1% by weight of a fatty acid monoglyceride having from 14 to 30 carbon atoms are excluded).

However, in the case where the addition amount of the fatty acid monoglyceride is 0.06% by weight or more, although the mold release property becomes good, there are problems in optical properties in that fog is formed in the substrate, and there are tendencies on an accelerated deterioration test under a high temperature and a high humidity in that the reduction in molecular weight and formation of polarized white turbid defects due to hydrolysis of the polycarbonate resin are accelerated. This means that the reliability on information recording as a DVD is deteriorated, and it is considered that the resins cannot satisfy practical purposes. There are disclosed evaluation results of the transferability and the mold release property of a stamper on molding in an example where a substrate having a thickness of 0.6 mm is molded at a relatively high temperature condition, in which a temperature of a cylinder of a molding machine is 380° C. and a temperature of a mold is 120° C. However, there is no description about the birefringence and the strength, as well as the molecular weight of the polycarbonate resin.

Furthermore, in the invention of (7), when the content of the fatty acid monoglyceride having from 14 to 30 carbon atoms is less than 0.06% by weight, there are problems in that the mold release property is insufficient, and the high speed moldability and the yield of the product are decreased. Since the polycarbonate resin contained in the compositions contains a relatively large amount of a monomer, there is a possibility of causing a problem in stability in a long period of time. The production process of the resin becomes complicated as comprising separation of the low molecular weight component, drying and re-addition thereof, and thus the production of the polycarbonate having a high purity becomes complicated and highly costly. Furthermore, the publications of (6) and (7) do not disclose influence of an end group of the polycarbonate resins.

While a substrate for a DVD is formed by adhering two substrates each having a diameter of 120 mm and a thickness of 0.6 mm, to realize a strength as a DVD, as well as increase in recording density by recording on both sides, further means for increasing the recording density has been proposed. That is, there is a tendency in that the depth of a pit becomes large from a DVD-ROM to a DVD-R and a DVD-RAM, and in order to transfer and shape the pit, it is necessary to increase the melt flowability, the molding temperature and the temperature of the mold. There are also increasing demands for increase of the moldability and the productivity of the substrate, increase of the yield of the product, and stabilization of the product quality.

In particular, there is a demand for increase of the moldability of the substrate associated with minuteness of the pit shape, particularly solution of both the transferability and the release property. When the release property and the strength of the substrate are insufficient, there is a case in that fine burrs are formed within the mold even though the releasing is apparently conducted without any problem, and the burrs are incorporated into a substrate on molding of the next cycle to become foreign matters causing a defective product, resulting in deterioration in yield of the product.

SUMMARY OF THE INVENTION

An object of the invention is to provide a polycarbonate resin composition that is excellent in transferability on injection molding, is excellent in releasing property from a mold and in strength, can be easily molded to form a substrate having a thickness of 0.6 mm with a good yield, and is excellent in optical property, a substrate for a DVD formed by molding the composition, a process for producing the substrate, and a DVD.

The inventors have made earnest investigations for the relationship between the molding property, such as the stamper transferability, mold release characteristics and the molding cycle, and the various characteristics of the resulting substrate when a thin substrate having a thickness of 0.6 mm is formed by injection molding at a relatively high resin temperature and a high mold temperature. As a result, it has been found that these objects can be attained by using a polycarbonate resin having a specific end group, and simultaneously specifying the species and the addition amount of the releasing agent, and thus the invention has been completed.

The invention provides:

(1) A substrate for a digital versatile disk comprising an aromatic polycarbonate resin composition containing a fatty acid monoglyceride having from 14 to 30 carbon atoms in an amount of from 0.015 to 0.05% by weight, wherein the aromatic polycarbonate resin contains an end group, 30% by mol or more of which is a p-cumylphenoxy group and/or a p-tert-octylphenoxy group, and has a viscosity average molecular weight (Mv) of from 10,000 to 17,000.

(2) A substrate for a digital versatile disk as described in item (1), wherein the substrate has a thickness of 0.6 mm or less.

(3) A substrate for a digital versatile disk as described in item (1) or (2), wherein the aromatic polycarbonate resin has a viscosity average molecular weight (Mv) of from 12,000 to 15,000.

(4) A substrate for a digital versatile disk as described in one of items (1) to (3), wherein the fatty acid monoglyceride is stearic acid monoglyceride.

(5) A polycarbonate resin composition for a substrate for a digital versatile disk comprising an aromatic polycarbonate resin composition containing a fatty acid monoglyceride having from 14 to 30 carbon atoms in an amount of from 0.015 to 0.05% by weight, wherein the aromatic polycarbonate resin contains an end group, 30% by mol or more of which is a p-cumylphenoxy group and/or a p-tert-octylphenoxy group, and has a viscosity average molecular weight (Mv) of from 10,000 to 17,000.

(6) A process for producing a substrate for a digital versatile disk comprising a step of injection molding a polycarbonate resin composition for a substrate for a digital versatile disk as described in item (5) under conditions of a resin temperature of from 340 to 400° C. and a mold temperature of from 80 to 130° C.

(7) A process for producing a substrate for a digital versatile disk as described in item (6), wherein the substrate has a thickness of 0.6 mm or less.

(8) A digital versatile disk comprising two sheets of a substrate for a digital versatile disk as described in one of items (1) to (4) adhered to each other.

DETAILED DESCRIPTION OF THE INVENTION

The aromatic polycarbonate resin used in the invention contains an end group, 30% by mol or more of which is a p-cumylphenoxy group and/or a p-tert-octylphenoxy group, and has a viscosity average molecular weight (Mv) of from 10,000 to 17,000. The basic structure of the aromatic polycarbonate resin is not particularly limited, and various structures can be employed. In general, an aromatic polycarbonate produced by the reaction of a divalent phenol and a carbonate precursor can be employed. That is, those obtained by reacting a divalent phenol with a carbonate precursor, such as phosgene, in a solution method, or by reacting a divalent phenol and diphenyl carbonate in an ester interchange method can be employed.

Various examples can be mentioned for the divalent phenol, including 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether and bis(4-hydroxyphenyl)ketone. Further examples of the divalent phenol include hydroquinone, resorcin and catechol. These divalent phenols may be used singly or in combination of two or more of them as a mixture.

A particularly preferred divalent phenol is a bis(hydroxypheyl)alkane series compound, particularly bisphenol A and one produced from bisphenol A as a main raw material. Examples of the carbonate precursor include a carbonyl halide, a carbonyl ester and a haloformate, and specific examples thereof include phosgene, a dihaloformate of a divalent phenol, diphenyl carbonate, dimethyl carbonate and diethyl carbonate.

The polycarbonate resin may have a branched structure, and examples of a branching agent include 1,1,1-tris(4-hydroxypheyl)ethane, α,α',α"-tris(4-hydroxyphenyl)-1,3,5-triisopropylbenzene, phloroglucin, trimellitic acid and isatinbis(o-cresol).

The aromatic polycarbonate used in the invention may be a copolymer having a polycarbonate part and a polyorganosiloxane part, or an aromatic polycarbonate resin containing the copolymer. It may also be a polyesterpolycarbonate resin obtained by conducting polymerization of polycarbonate in the presence of an ester precursor, such as a bifunctional carboxylic acid, e.g., terephthalic acid, or its ester forming derivative.

The aromatic polycarbonate resin used in the invention has a characteristic feature in that it has the specific end group and the specific viscosity average molecular weight (Mv). Adjustment of the end group of the aromatic polycarbonate resin can be conducted by using various phenols as a terminating agent on a general production process of polycarbonate. Examples of the phenol include phenol, dimethylphenol, p-tert-butylphenol, 2,6-dimethyl-4-tert-butylphenol, p-tert-octylphenol and p-cumylphenol. Therefore, the aromatic polycarbonate resin has an end group obtained by reacting the terminating agent and an end group derived from a divalent phenol. In the invention, it is necessary that 30% by mol or more, preferably 70% by mol or more, and more preferably 90% by mol or more, of the whole of the end group is a p-cumylphenoxy group and/or a p-tert-octylphenoxy group obtained by reacting p-cumylphenol and/or p-tert-octylphenol.

Therefore, the aromatic polycarbonate resin used in the invention is an aromatic polycarbonate resin having a p-cumylphenoxy group, an aromatic polycarbonate resin having a p-tert-octylphenoxy group, a mixture with an aromatic polycarbonate resin having other phenoxy group that is selected in such a manner that 30% by mol or more of the total end group of the aromatic polycarbonate resin is a p-cumylphenoxy group and/or a p-tert-octylphenoxy group.

Examples of the aromatic polycarbonate resin used in the invention include an aromatic polycarbonate resin having a main chain having a structure represented by formula (I), and having an end group represented by formula (II) or a hydroxyl group, in which 30% by mol or more of the total end group is represented by formula (III) or formula (IV):

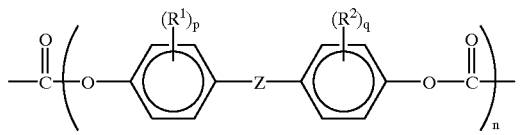

(I)

wherein $R^1$ and $R^2$, which may be the same or different, each represents a halogen atom, an alkyl group having from 1 to 6 carbon atoms, or a phenyl group; Z represents a single bond, an alkylene group having from 1 to 20 carbon atoms, an alkylidene group having from 1 to 20 carbon atoms, a cycloalkylene group having from 5 to 20 carbon atoms, a cycloalkylidene group having from 5 to 20 carbon atoms, —O—, —S—, —SO—, —SO$_2$—, or —CO—; p and q each is an integer of from 0 to 4; and n represents a repeating number,

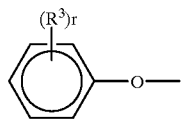

(II)

wherein $R^3$ represents a halogen atom, an alkyl group having from 1 to 20 carbon atoms, or an aryl group having from 6 to 20 carbon atoms; and r is an integer of from 0 to 5,

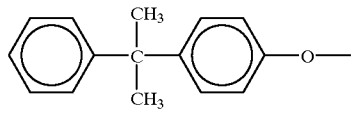

(III)

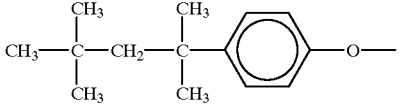

(IV)

In the aromatic polycarbonate resin used in the invention, $R^1$ and $R^2$ in formula (I) each represents a halogen atom, an alkyl group having from 1 to 6 carbon atoms, or a phenyl group. Examples of the halogen atom include a chlorine atom, a bromine atom, a fluorine atom and an iodine atom. The alkyl group having from 1 to 6 carbon atoms may be any of linear, branched and cyclic one, and examples thereof include a methyl group, an ethyl group, a n-propyl group, an isopropyl group, a n-butyl group, an isobutyl group, a tert-butyl group, an amyl group, an isoamyl group, a hexyl group, an isohexyl group and a cyclohexyl group. $R^1$ and $R^2$ may be the same or different. In the case where there are plural groups of $R^1$ or $R^2$, the plural groups of $R^1$ or $R^2$ may be the same or different.

In formula (I), Z represents a single bond, an alkylene group having from 1 to 20 carbon atoms, an alkylidene group having from 1 to 20 carbon atoms, a cycloalkylene group having from 5 to 20 carbon atoms, a cycloalkylidene group having from 5 to 20 carbon atoms, —O—, —S—, —SO—, —SO$_2$—, or —CO—; p and q each is an integer of from 0 to 4; and n represents a repeating number. Examples of the alkylene group having from 1 to 20 carbon atoms and the alkylidene group having from 1 to 20 carbon atoms include a methylene group, an ethylene group, a propylene group, a butylene group, a pentylene group, a hexylene group, an ethylidene group and an isopropylidene group. Examples of the cycloalkylene group having from 5 to 20 carbon atoms and the cycloalkylidene group having from 5 to 20 carbon atoms include a cyclopentylene group, a cyclohexylene group and a cyclohexylidene group. n is such a number that the viscosity average molecular weight of the aromatic polycarbonate resin is in a range of from 10,000 to 17,000.

The aromatic polycarbonate used in the invention has an end group represented by formula (II) or a hydroxyl group. In formula (II), $R^3$ represents a halogen atom, an alkyl group having from 1 to 20 carbon atoms, or an aryl group having from 6 to 20 carbon atoms. Examples of the halogen atom include a chlorine atom, a bromine atom, a fluorine atom and an iodine atom. The alkyl group having from 1 to 20 carbon atoms may be any of linear, branched and cyclic one, and examples thereof include a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group and a cyclohexyl group. The aryl group having from 6 to 20 carbon atoms may be one having no substituent group on an aromatic ring thereof, or may be one having an appropriate substituent group, such as a lower alkyl group. Examples thereof include a phenyl group, a tolyl group, a xylyl group, a naphthyl group and a methylnaphthyl group. r is an integer of from 0 to 5, and in the case where there are plural groups of $R^3$, the plural groups of $R^3$ may be the same or different. The aromatic polycarbonate resin may contain one species of the end group represented by formula (II), or may contain two or more species thereof.

It is necessary that a p-cumylphenoxy group and/or a p-tert-octylphenoxy group represented by formula (III) and/or formula (IV) is contained in an amount of 30% by mol or more with respect to the total end group. A p-tert-butylphenoxy group and/or a phenoxy group are preferred as the other end group, and a small amount of a hydroxyl group may be contained.

The aromatic polycarbonate resin used in the invention has a viscosity average molecular weight (Mv) of from 10,000 to 17,000, preferably from 12,000 to 15,000, and more preferably from 12,500 to 14,500. When the viscosity average molecular weight (Mv) is less than 10,000, the strength, particularly the impact resistance, becomes insufficient, and thus it is difficult to form a thin substrate having a thickness of 0.6 mm. When it exceeds 17,000, although the impact resistance is sufficient, the molding property of a thin substrate having a thickness of 0.6 mm and the transferability of a stamper having fine unevenness are decreased, and the optical characteristics deteriorated, for example, the birefringence of the substrate is increased. As a result, it is difficult to satisfy the performance as a digital versatile disk (DVD).

The viscosity average molecular weight (Mv) of the aromatic polycarbonate resin used in the invention is obtained in such a manner that a specific viscosity ($\eta_{sp}$) is obtained by measuring a solution obtained by dissolving about 0.7 g of the aromatic polycarbonate resin in 100 ml of methylene chloride with an Ubbelohde's viscometer, and the specific viscosity ($\eta_{sp}$) is inserted into the following equation:

$(\eta_{sp})/C=[\eta]+0.45\times[\eta]^2 C$ $[\eta]=1.23\times10^{-4}\ M^{0.83}$ wherein $[\eta]$ is an intrinsic viscosity, and C is a polymer concentration.

As described in the foregoing, a substrate for a DVD should satisfy both the mechanical characteristics, such as the impact resistance, and the properties, such as the moldability and the optical characteristics, which are contradictory to each other. Therefore, it is preferred that an aromatic polycarbonate resin having a lower viscosity average molecular weight (Mv) is selected as far as the strength characteristics, such as the impact resistance, are satisfied. In the relationship between the viscosity average molecular weight, i.e., the molten viscosity, and the falling-weight impact strength as a practical physical property, the aromatic polycarbonate resin having the specific end group used in the invention maintains a sufficient falling-weight impact strength at a considerably low viscosity average molecular weight in comparison to the polycarbonate resin having a phenoxy group or a p-tert-butylphenoxy group, which is generally used. In the invention, a substrate excellent in optical characteristics can be molded at a high cycle by the synergism with the selection of the additives and the determination of the addition amount thereof described later.

In the aromatic polycarbonate resin used in the invention, the content of a hydroxyl group is preferably 1% by mol or less, and more preferably 0.3% by mol or less. It is also preferred that the contents of chlorine, sodium and a fine particle impurity (insoluble matters in methylene chloride) are decreased as much as possible by purification and removal means, such as washing, filtration and centrifugation, or by a degassing under melt-kneading process. In the aromatic polycarbonate resin, the content of the low molecular weight component that is extracted through Soxhlet extraction using an acetone solvent is generally preferably 10% by weight or less.

The substrate for a DVD according to the invention comprises the aromatic polycarbonate resin having the specific end group as a main component, and further comprises a fatty acid monoglyceride having from 14 to 30 carbon atoms in a specific range of amount. The fatty acid monoglyceride having from 14 to 30 carbon atoms is a monoester compound of a fatty acid having from 14 to 30 carbon atoms and glycerin, examples of which include parmitic acid monoglyceride, stearic acid monoglyceride, arachic acid monoglyceride, behenic acid monoglyceride and montanic acid monoglyceride, and a mixture of them may also be used. The fatty acid monoglyceride is preferably, in view of the effect of the mold release property, stearic acid monoglyceride and behenic acid monoglyceride, and particularly preferably stearic acid monoglyceride.

The fatty acid monoglyceride preferably has a lower content of an impurity, such as sodium and chlorine, from the standpoint of the long term stability, particularly the stability under a high temperature and high humidity condition, when the substrate for a DVD is used as a recording medium. For example, the content of sodium is preferably 30 ppm by weight or less, and particularly preferably 20 ppm by weight or less.

The content of the fatty acid nonoglyceride is from 0.015 to 0.05% by weight, and preferably from 0.020 to 0.04% by weight. When the content of the fatty acid monoglyceride is less than 0.015% by weight, the mold release property is deteriorated, and when it exceeds 0.05% by weight, there is a case where the optical property is deteriorated, for example, fog is formed in the substrate. In order to increase the performance of the substrate for a DVD and to increase the productivity by shortening the molding cycle, molding conditions of a high resin temperature of 340° C. or more and a high mold temperature of 80° C. or more, particularly from 90 to 130° C., are employed. In such a case, it is important that the content of the fatty acid monoglyceride is in the range specified above to realize both the moldability and the characteristics of the substrate.

In the substrate for a DVD according to the invention, various stabilizers and coloring agents may be contained as far as the object of the invention is not impaired. As the stabilizer, a phosphorous series stabilizer, such as a phosphite and a phosphate, is preferably employed. Examples of the phosphite include a triester, a diester and a monoester of phosphorous acid, such as triphenyl phosphite, trisnonylphenyl phosphite, tris(2,4-di-tert-butylphenyl)phosphite, trinonyl phosphite, tridecyl phosphite, trioctyl phosphite, trioctadecyl phosphite, distearylpentaerythritol diphosphite, tricyclohexyl phosphite, monobutyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite and tetrakis(2,4-di-tert-butylphenyl)-4,4-diphenylene phosphonate. Among these, trisnonylphenyl phosphite, tris(2,4-di-tert-butylphenyl)phosphite and distearylpentaerythritol diphosphite are preferred.

Examples of the phosphate include trimethyl phosphate, triethyl phosphate, tributyl phosphate, trioctyl phosphate, triphenyl phosphate, tricresyl phosphate, tris(nonylphenyl) phosphate and 2-ethylphenyldiphenyl phosphate. These phosphorous series stabilizers may be used singly or in combination of two or more of them.

The content of the phosphorous series stabilizer is suitably in the range of from 0.001 to 0.02% by weight in terms of a phosphorous atom. When the content is less than 0.001% by weight, the contribution to the stability is small, and when it exceeds 0.02% by weight, there is a case where it causes deterioration in a long period of time when the resin is formed into a DVD. Therefore, it is preferred that the phosphorous series stabilizer is added in a smallest necessary amount to ensure the heat stability on molding the substrate for a DVD.

On the production of the substrate for a DVD according to the invention, a prescribed amount of the specific fatty acid monoglyceride is added to the aromatic polycarbonate resin having the specific end group, with other additives being added thereto depending on necessity, and they are melted and kneaded to produce pellets of a resin composition for molding a substrate for a DVD. A substrate for a DVD is then molded by using the pellets as a raw material by injection molding or injection compression molding. In this case, an ultrasonic wave may be applied to a mold upon molding.

As the injection molding conditions, the resin temperature is from 340 to 400° C., and preferably from 350 to 390° C., and the mold temperature is from 80 to 140° C., and preferably from 90 to 130° C. Under these temperature conditions, the molten resin is molded by being injected into a cavity having a diameter of 120 mm and a thickness of 0.6 mm of a mold having a stamper. The molding cycle is generally from 3 to 10 seconds, and preferably from 3 to 9 seconds.

The substrate for a DVD according to the invention generally has a diameter of 120 mm and a thickness of 0.6 mm. Two sheets of the molded substrates, each of which is a single plate having a thickness of 0.6 mm, are adhered to each other to be used as a DVD as an optical recording medium. A DVD includes a DVD-ROM, a DVD-R and a DVD-RAM as described in the foregoing, and the substrate for a DVD according to the invention is used as a substrate of them.

The invention will be described in more detail with reference to Examples and Comparative Examples, but the invention is not construed as being limited thereto.

Production of Aromatic Polycarbonate Resin

PC-A:

60 kg of bisphenol A was dissolved in 400 L of a 5% by weight sodium hydroxide aqueous solution to prepare a sodium hydroxide aqueous solution of bisphenol A. The sodium hydroxide aqueous solution of bisphenol A at room temperature was introduced at a flow rate of 138 L/hour and methylene chloride was introduced at a flow rate of 69 L/hour into a tubular reactor having a diameter of 10 mm and a length of 10 m through an orifice, and phosgene was blown thereinto at a flow rate of 10.7 kg/hour to continuously and react for 3 hours. The discharge temperature of the reaction solution was adjusted to 25° C., and the pH of the discharge solution was adjusted from 10 to 11. After the resulting reaction solution was allowed to stand, an aqueous phase was removed to collect a methylene chloride phase (220 L), and thus a polycarbonate oligomer solution was obtained.

166.7 g of p-cumylphenol was dissolved in 10 L of the oligomer solution, and a sodium hydroxide aqueous solution (NaOH: 75 g, water: 1.0 L) and 1.17 ml of triethylamine were added thereto, followed by stirring at 300 rpm for 30 minutes. 8L of methylene chloride and a sodium hydroxide aqueous solution of bisphenol A (bisphenol A: 607 g, NaOH: 320 g, water: 5L) were added thereto, and the solution was stirred at 500 rpm for 1 hour at an ordinary temperature. Thereafter, 5 L of methylene chloride and 5 L of water were added thereto, and the solution was stirred at 500 rpm for 10 minutes at room temperature. After terminating stirring, the solution was allowed to stand to obtain an organic phase. The organic phase was subjected to alkali washing with 5 L of a 0.03 N sodium hydroxide aqueous solution, acid washing with 5 L of 0.2 N hydrochloric acid, and then water washing (twice) with 5 L of water. Methylene chloride was removed by distillation, and the solution was dried, to obtain an aromatic polycarbonate resin (A) in the form of flakes. It was confirmed by an NMR measurement that substantially 100% by mol of an end group of the resin was a p-cumylphenoxy group.

PC-B:

An aromatic polycarbonate resin (B) was obtained in the same manner as in the preparation of PC-A except that 162.0 g of p-tert-octylphenol was used instead of 166.7 g of p-cumylphenol. Substantially 100% by mol of an end group of the resin was a p-tert-octylphenoxy group.

PC-C:

An aromatic polycarbonate resin (C) was obtained in the same manner as in the preparation of PC-A except that 141.7 g of p-cumylphenol and 17.7 g of p-tert-butylphenol was used instead of 166.7 of p-cumylphenol. About 85% by mol of an end group were a p-cumylphenoxy group and about 15% by mol of an end group were a p-tert-butylphenoxy group.

PC-D:

An aromatic polycarbonate resin (D) was obtained in the same manner as in the preparation of PC-A except that 118.0 g of p-tert-butylphenol was used instead of 166.7 g of p-cumylphenol. Substantially 100% by mol of an end group of the resin was a p-tert-butylphenoxy group.

EXAMPLES 1 TO 6 AND COMPARATIVE EXAMPLES 1 TO 3

0.025% by weight of stearic acid monoglyceride and 0.004% by weight of tris(2,4-di-tert-butylphenyl)phosphite were added to the aromatic polycarbonate resin shown in Table 1 below, followed by subjecting to dry blending, and the resulting mixture was subjected to melt kneading to obtain pellets of the aromatic polycarbonate resin. A substrate for a DVD was molded using the pellets by using a mold (diameter: 120 mm, thickness: 0.6 mm, pit depth: stamper for DVD-ROM of 140 nm) at a resin temperature of 370° C., a mold temperature of 100° C. and a molding cycle of 5.3 seconds.

Evaluations of the moldability and evaluation results as a substrate according to the following evaluation methods are shown in Tables 1 and 2 below.

1. Transferability

The transferability shows a value dividing the pit depth (nm) (concave part) of the molded article (substrate for DVD) by the pit height (140 nm) (convex part) of the stamper. The value shown as a result is an average value of the measurement values (four points) at the inner peripheral part (at the point in the data area apart from the starting edge of the data area toward the outside by about 1 mm, i.e., the region apart from the center by 24 to 26 mm) and the measurement values (four points) at the outer peripheral part (at the point in the data area apart from the ending edge of the data area toward the inside by about 1 mm, i.e., the region apart from the center by 115 to 117 mm). The measurement was conducted by using a scanning probe type microscope produced by Seiko Instruments Inc.

2. Releasability

The releasability was evaluated by observing the molding conditions with the naked eye for the following two grades:

A: Released without any problem

B: Problem arises

The evaluation grade B herein means that a robot fails to take out a substrate from a molding machine due to release failure of the substrate or a sprue to stop the molding machine.

3. Falling-weight Impact Strength (Substrate Strength)

A substrate, which was left for 24 hours after molding, was subjected to an impact at a position apart from the center of the substrate by 18 mm under the conditions of a load of 3.76 kg, a velocity of 5 m/sec and a longer diameter of a receiving base of 50 mm, to obtain a falling-weight impact strength in terms of an energy (J).

4. Birefringence

The birefringence was measured with a double refraction measurement system ADR-200 produced by ORC Manufacturing Co., Ltd. The minimum value (MIN) and the maximum value (MAX) within the measuring range apart from the center of the substrate by from 23 to 58 mm are shown.

6. Tangential Tilt and Radial Tilt

The tangential tilt means a camber angle in the circumferential direction, which is a value obtained by calculating a camber angle from a run-out measurement data. The tangential tilt is preferably 0.3 radian or less.

The radial tilt means a camber angle in the radial direction, which is obtained by analyzing a run-out measurement data in a radial direction to calculate a camber angle. The absolute value of the radial tilt is preferably 1 radian or less.

The measurement was conducted by using an optical disk mechanical characteristics measuring apparatus LM1200 produced by Ono Sokki Co., Ltd., and the maximum value in the radial direction of the substrate was used.

TABLE 1

| | Raw material resin composition | | | Moldability | | | |
| --- | --- | --- | --- | --- | --- | --- | --- |
| | Polycarbonate | | | Transferability | | | |
| | Species | Molecular weight | Additive (% by weight) | Inner periphery | Outer periphery | Releasability | Yield (%) |
| Example 1 | PC-A | 14,200 | 0.025 | 1.00 | 0.99 | A | 98 |
| Example 2 | PC-A | 13,800 | 0.025 | 1.00 | 1.00 | A | 96 |
| Example 3 | PC-A | 13,400 | 0.025 | 1.00 | 1.00 | A | 97 |
| Example 4 | PC-A | 13,000 | 0.025 | 1.00 | 1.00 | A | 97 |
| Example 5 | PC-B | 14,200 | 0.025 | 1.00 | 0.99 | A | 98 |
| Example 6 | PC-C | 14,200 | 0.025 | 1.00 | 1.00 | A | 97 |
| Comparative Example 1 | PC-D | 14,200 | 0.025 | 1.00 | 1.00 | A | 99 |
| Comparative Example 2 | PC-D | 13,400 | 0.025 | 1.00 | 1.00 | A | 97 |
| Comparative Example 3 | PC-D | 15,400 | 0.025 | 0.98 | 0.95 | A | 98 |

TABLE 2

| | Substrate strength Falling-weight impact strength (J) | Birefringence (nm) (position in radial direction (mm)) | | Tangential tilt (radian) | Radial tilt (radian) |
| --- | --- | --- | --- | --- | --- |
| | | MIN | MAX | | |
| Example 1 | 5.2 | −41 (27.0) | 16 (27.0) | 0.24 (58.0) | −0.72 (58.0) |
| Example 2 | 4.3 | −29 (30.0) | 15 (58.0) | 0.19 (45.5) | −0.65 (58.0) |

TABLE 2-continued

|  | Substrate strength Falling-weight impact strength (J) | Birefringence (nm) (position in radial direction (mm)) | | Tangential tilt (radian) | Radial tilt (radian) |
| --- | --- | --- | --- | --- | --- |
|  |  | MIN | MAX |  |  |
| Example 3 | 3.7 | −35 (30.0) | 20 (58.0) | 0.23 (58.0) | −0.61 (58.0) |
| Example 4 | 3.3 | −25 (30.0) | 13 (58.0) | 0.19 (45.5) | −0.33 (58.0) |
| Example 5 | 5.4 | −39 (27.0) | 16 (58.0) | 0.23 (58.0) | −0.72 (58.0) |
| Example 6 | 4.9 | −41 (27.0) | 23 (58.0) | 0.11 (58.0) | 0.93 (58.0) |
| Comparative Example 1 | 3.9 | −49 (30.0) | 18 (58.0) | 0.19 (53.0) | 0.37 (58.0) |
| Comparative Example 2 | 2.5 | −32 (30.0) | 23 (58.0) | 0.09 (25.5) | −0.83 (58.0) |
| Comparative Example 3 | 5.8 | −92 (25.0) | 28 (58.0) | 0.14 (55.5) | −1.11 (58.0) |

EXAMPLES 7 TO 9 AND COMPARATIVE EXAMPLES 4 TO 6

Pellets of a resin composition for molding a substrate for a DVD by using PC-A as an aromatic polycarbonate resin were obtained according to the manner of Example 1 with changing the addition amount of stearic acid monoglyceride. 1,000 pieces of substrates for a DVD were continuously molded under the same conditions as in Example 1, and the yield (proportion of non-defectives determined by a flaw inspector) was inspected. The substrate was subjected to an accelerated deterioration test for 1,000 hours under constant temperature and humidity conditions of a temperature of 90° C. and a humidity of 90%, and the viscosity average molecular weight after the test was measured to evaluate. The evaluation results are shown in Table 3. The moldability was evaluated in the same manner as in Example 1.

It is clear from Table 3 that a substrate satisfying both the moldability and the durability is obtained within the specific range of the content of stearic acid monoglyceride.

TABLE 3

|  | Addition amount of additive (% by weight) | Moldability | | | | Wet heat resistance | | |
| --- | --- | --- | --- | --- | --- | --- | --- | --- |
|  |  | Transferability | | Releasa-bility | Yield (%) | Molecular weight before test (Mv) | Molecular weight after test (Mv) | ΔMv |
|  |  | Inner periphery | Outer Periphery |  |  |  |  |  |
| Example 7 | 0.025 | 1.00 | 1.00 | A | 98 | 14,200 | 14,200 | 0 |
| Example 8 | 0.035 | 1.00 | 0.99 | A | 97 | 14,200 | 14,100 | 100 |
| Example 9 | 0.050 | 1.00 | 1.00 | A | 99 | 14,000 | 13,800 | 200 |
| Comparative Example 4 | 0.008 | 1.00 | 1.00 | B | 84 | 14,100 | 14,100 | 0 |
| Comparative Example 5 | 0.015 | 1.00 | 1.00 | A | 93 | 14,200 | 14,100 | 100 |
| Comparative Example 6 | 0.100 | 1.00 | 0.99 | A | 96 | 14,200 | 13,900 | 300 |

The substrate for a digital versatile disk (DVD) according to the invention comprises an aromatic polycarbonate resin having a specific end structure, to which a specific additive is added in a specific amount. It is excellent in continuous moldability, satisfies the strength and the optical characteristics, and is suitably used as a substrate for a DVD that exhibits extremely high utility in a substrate having a thickness of 0.6 mm.

What is claimed is:

1. A substrate for a digital versatile disk comprising an aromatic polycarbonate resin composition containing a fatty acid monoglyceride having from 14 to 30 carbon atoms in an amount of from 0.015 to 0.05% by weight, wherein an aromatic polycarbonate resin, which is a main component of said aromatic polycarbonate resin composition, contains an end group, 30% by mol or more of which is at least one group selected from a p-cumylphenoxy group and a p-tert-octylphenoxy group, and has a viscosity average molecular weight (Mv) of from 10,000 to 17,000.

2. A substrate for a digital versatile disk as claimed in claim 1, wherein said substrate has a thickness of 0.6 mm or less.

3. A substrate for a digital versatile disk as claimed in claim 2, wherein said aromatic polycarbonate resin has a viscosity average molecular weight (Mv) of from 12,000 to 15,000.

4. A substrate for a digital versatile disk as claimed in claim 2 or 3, wherein said fatty acid monoglyceride is stearic acid monoglyceride.

5. A polycarbonate resin composition for a substrate for a digital versatile disk comprising an aromatic polycarbonate resin composition containing a fatty acid monoglyceride having from 14 to 30 carbon atoms in an amount of from 0.015 to 0.05% by weight, wherein an aromatic polycarbonate resin, which is a main component of said aromatic polycarbonate resin composition, contains an end group, 30% by mol or more of which is at least one group selected from a p-cumylphenoxy group and a p-tert-octylphenoxy group, and has a viscosity average molecular weight (Mv) of from 10,000 to 17,000.

6. A process for producing a substrate for a digital versatile disk comprising a step of injection molding a polycarbonate resin composition for a substrate for a digital versatile disk as claimed in claim 5 under conditions of a resin temperature of from 340 to 400° C. and a mold temperature of from 80 to 130° C.

7. A process for producing a substrate for a digital versatile disk as claimed in claim 6, wherein said substrate has a thickness of 0.6 mm or less.

8. A digital versatile disk comprising two sheets of a substrate for a digital versatile disk as claimed in claim 2 adhered to each other.

* * * * *